(12) United States Patent
Williamson et al.

(10) Patent No.: US 9,169,893 B2
(45) Date of Patent: Oct. 27, 2015

(54) VIBRATION DAMPER

(71) Applicants: Susan Joyce Williamson, Leonard, MI (US); Glen Everitt Moore, St. Clair Shores, MI (US)

(72) Inventors: Susan Joyce Williamson, Leonard, MI (US); Glen Everitt Moore, St. Clair Shores, MI (US)

(*) Notice: Subject to any disclaimer, the term of this patent is extended or adjusted under 35 U.S.C. 154(b) by 0 days.

(21) Appl. No.: 13/834,314

(22) Filed: Mar. 15, 2013

(65) Prior Publication Data

US 2013/0243526 A1 Sep. 19, 2013

Related U.S. Application Data

(60) Provisional application No. 61/611,757, filed on Mar. 16, 2012, provisional application No. 61/657,113, filed on Jun. 8, 2012, provisional application No. 61/678,788, filed on Aug. 2, 2012.

(51) Int. Cl.
| | |
|---|---|
| *B25D 17/04* | (2006.01) |
| *F16F 15/02* | (2006.01) |
| *E01C 19/35* | (2006.01) |
| *E02D 3/046* | (2006.01) |
| *A47L 11/40* | (2006.01) |
| *F16F 15/08* | (2006.01) |

(52) U.S. Cl.
CPC .............. *F16F 15/02* (2013.01); *A47L 11/4097* (2013.01); *E01C 19/35* (2013.01); *E02D 3/046* (2013.01); *F16F 15/08* (2013.01)

(58) Field of Classification Search
CPC ........... F16F 15/02; F16F 15/08; F16F 15/04; F16F 1/3732; F16F 1/3735; B25D 17/043; B25D 17/24; B25D 5/006; B27B 17/0033

USPC ................ 173/162.1; 16/431, 442, 441, 446; 248/603, 604, 614, 638; 267/137, 136
See application file for complete search history.

(56) References Cited

U.S. PATENT DOCUMENTS

| | | | | |
|---|---|---|---|---|
| 3,367,609 | A * | 2/1968 | Latter | 312/351 |
| 3,542,322 | A * | 11/1970 | Dvorin | 248/632 |
| 3,565,386 | A * | 2/1971 | Lemkuil et al. | 248/573 |
| 3,581,832 | A * | 6/1971 | Heermann et al. | 173/162.2 |
| 3,728,793 | A * | 4/1973 | Makinson et al. | 30/383 |
| 3,849,883 | A * | 11/1974 | Kolorz | 30/381 |
| 3,972,119 | A * | 8/1976 | Bailey | 30/381 |
| 4,401,167 | A * | 8/1983 | Sekizawa et al. | 173/162.1 |
| 5,306,121 | A * | 4/1994 | Heflin et al. | 417/363 |
| 5,927,407 | A * | 7/1999 | Gwinn et al. | 173/162.2 |
| 7,806,230 | B2 * | 10/2010 | Jacobs | 181/247 |
| 7,900,873 | B2 * | 3/2011 | Kulesha et al. | 244/135 R |
| 8,141,679 | B2 * | 3/2012 | Jacobs | 181/247 |
| 8,475,236 | B2 * | 7/2013 | Zhang et al. | 451/354 |
| 2010/0012338 | A1 * | 1/2010 | Okabe et al. | 173/162.2 |
| 2010/0068977 | A1 * | 3/2010 | Zhang et al. | 451/357 |

* cited by examiner

*Primary Examiner* — Andrew M Tecco
(74) *Attorney, Agent, or Firm* — Howard & Howard Attorneys PLLC

(57) ABSTRACT

A vibration reducing interface which uses interconnected layers of three or more concentrically arranged isolators to reduce vibrations in tools, vehicles, machines, weapons and anything else which uses pumps, compressors, engines, motors, spinning elements, out of balance loads or inconsistent, variable loading. The vibration reducing interface provides for tiering arranged isolators for reducing varying degrees and directions of vibration. The vibration reducing interface reduces vibration and its related negative affects including injury, damage and reduced control in relation to use of tools, vehicles, machines, weapons and other equipment.

20 Claims, 14 Drawing Sheets

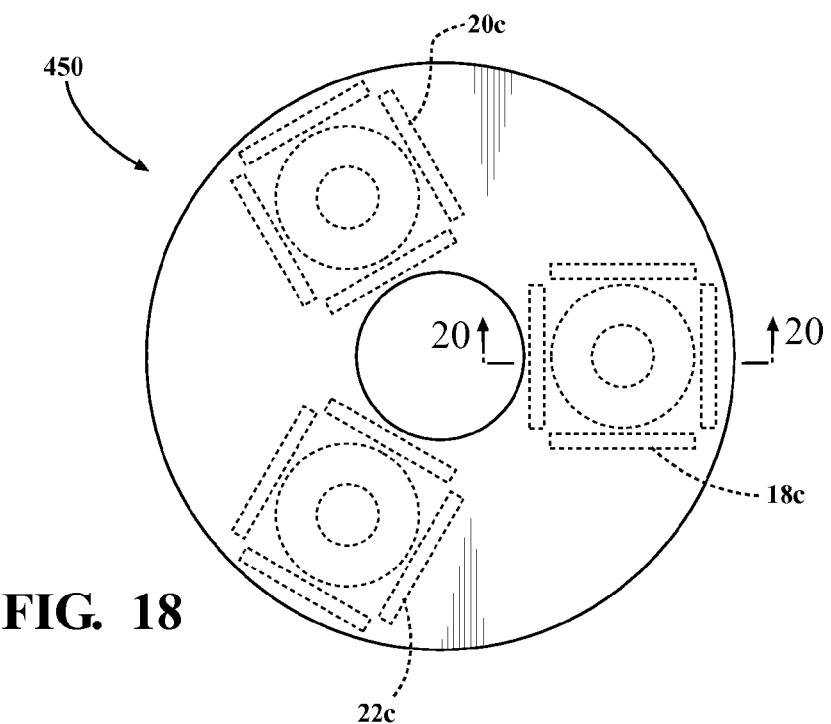
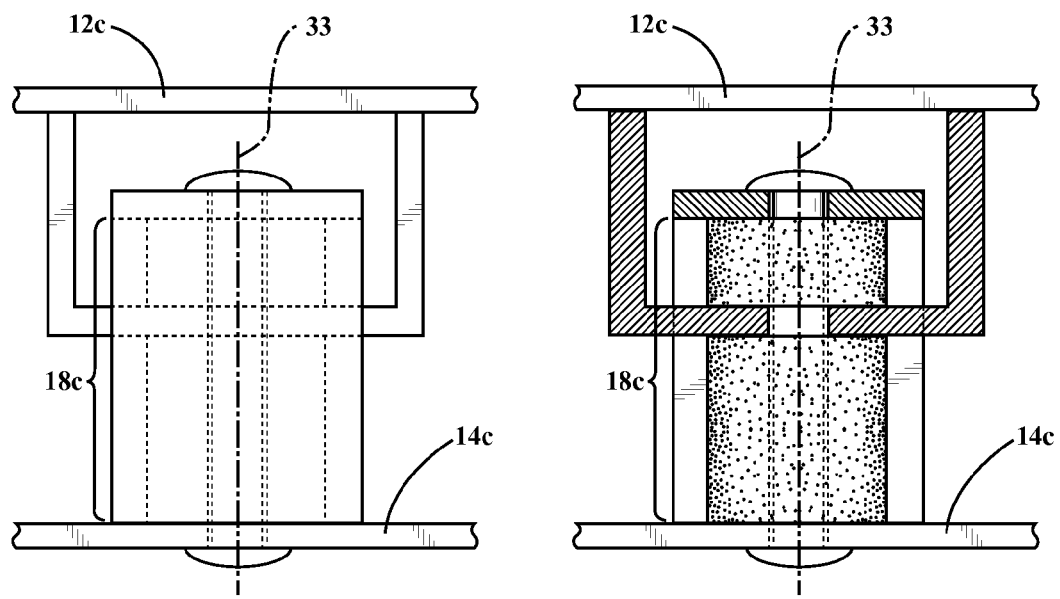
FIG. 18
FIG. 19     FIG. 20

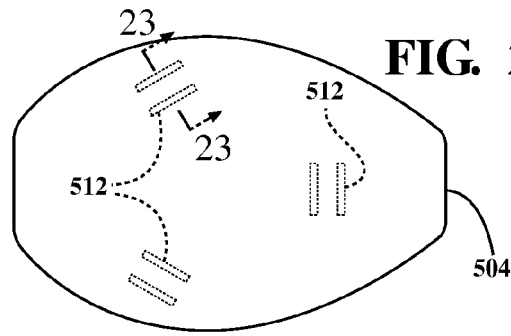
FIG. 22
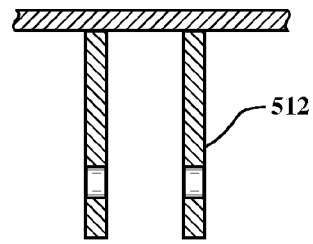
FIG. 23
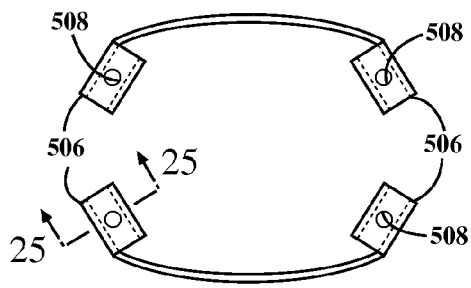
FIG. 24
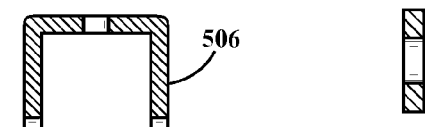
FIG. 25
FIG. 27
FIG. 26
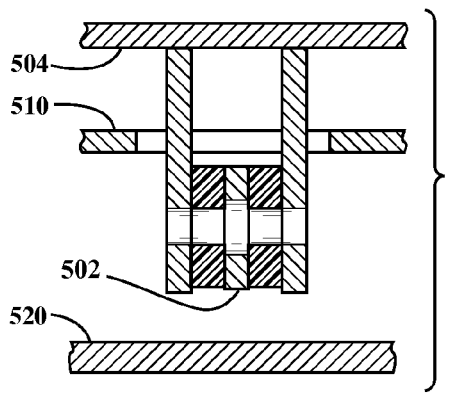
FIG. 28
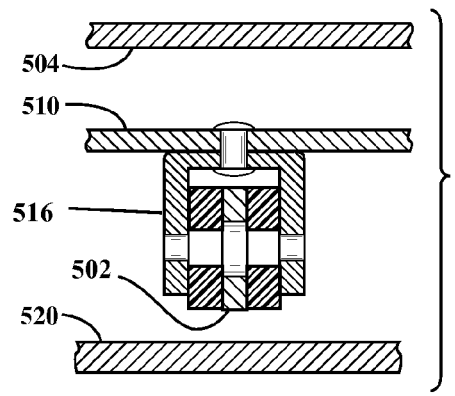
FIG. 29

VIBRATION DAMPER

CROSS-REFERENCE TO RELATED APPLICATIONS

This application claims priority to provisional Application No. 61/611,757, filed on Mar. 16, 2012, and to provisional Application No. 61/657,113, filed on Jun. 8, 2012 as well as to provisional Application No. 61/678,788, filed on Aug. 2, 2012. The disclosures of the prior applications are incorporated herein by reference.

TECHNICAL FIELD

The invention generally relates to vibration dampeners and more specifically vibration dampening systems.

BACKGROUND

Vibration can be a nuisance or at times cause catastrophic consequences including personal injury and damage to property. Vibration occurs in many different forms, and regularly arises out of use of tools, equipment, and machinery common in everyday application. Vibration control and attenuation is important in preventing both injury and property damage. It is also important in preventing damage to structures either housing equipment or machinery, or upon which the equipment or machinery is being used.

Vibration control and attenuation can be accomplished in many different ways. This includes passive control devices, active control devices, and hybrid devices. It is not uncommon for tools, equipment or machinery causing vibrations to utilize dampeners that in many instances are solid structures having a durometer appropriate for absorbing vibration. For example, machinery such as aircraft and motor vehicles have motor mounts connecting an aircraft or motor vehicle motor to the aircraft or motor vehicle structure where the motor mounts contain structures including solid blocks of vibration absorbing material, such as rubber, that will attenuate vibration resulting from the motor operation. These types of vibration control devices are limited in their ability to entirely reduce vibration due to varying degrees of vibrations that occur as a result of variations caused by the oscillations of a tool, equipment and machinery. Further, it is well known that in many applications tools, equipment and machinery have continuing vibration conditions that are not adequately addressed with current dampeners. In addition, hand held tools and firearms exhibit vibrations that are not adequately addressed with current applications, including solid dampening systems. Therefore, it would be an advantage to provide a vibration dampening system that counters or attenuates vibrations in a manner that accounts for variations in the direction and degree of oscillations but does not add significant cost or weight and burden to existing tool, equipment or machinery systems.

Further, vibrations are known to cause injury, especially in applications where individuals control a tool, equipment or machinery that is vibrating during its operation. Injuries include vibration white finger (VWF), also known as hand-arm vibration syndrome (HAVS) or "dead-finger." This is an injury triggered by continuous use of vibrating machinery. HAVS is a widespread recognized industrial disease affecting tens of thousands of workers. It is a disorder that affects the blood vessels, nerves, muscles and joints of the hand, wrist and arm. Good practice in industrial health and safety management requires that worker vibration exposure is assessed in terms of acceleration, amplitude and duration. For example, using a tool that vibrates slightly for a long time can be as damaging as using a heavily vibrating tool for a short time. Therefore, it is important to develop and implement systems that dampen and attenuate vibration, that addresses heavy vibration and lighter vibration that can occur for longer periods of time.

In physics, dampening is an effect that reduces the amplitude of oscillations in an oscillatory system. Dampening can be achieved in an overdamp, critically damped, under damped and undamped result. The difficulty in addressing dampening of a vibrating system is accounting for variations in oscillations (vibrations) that in many instances change based on the operation of tool, equipment or machinery and associated motor/engine including its associated vibrating systems. Vibration dampening can be resolved through phase shifting occurring when a vibrating system is countered with a system that changes the oscillations in a manner that the oscillations are cancelled through phase differentiation. Therefore, it is desirable to develop and provide an economical system for dampening vibrations that is adaptable to wide application and will provide a safe and stable system for cancelling vibration in a wide range of vibrating systems.

Vibration control is important not only to reduce injury to operators and passengers in the case of vehicles/aircraft applications, but is also important to reduce damage to equipment and machinery, including the surrounding structure of the vibrating source and associated equipment such as control equipment in an aircraft. Further, vibration control is necessary to reduce damage to cargo. In addition, vibration control is important for allowing control of the vibrating system. For example, control of hand held tool or equipment could be greatly increased with adequate vibration control. Without it, hand held equipment can become cumbersome and virtually uncontrollable for its operators. This can relate to simple equipment such as a hand held hammer drill or floor cleaning or polishing equipment that if uncontrolled will be difficult to move due to its inherent vibrations.

In addition, it is important that the points of vibration control not create a weak link in a tool, equipment or machinery. Therefore, it is necessary to have a robust structure, having vibration dampening capability that adequately addresses the problems created by vibration but does not create structural weakness problems. Lastly, vibration may not be necessarily linear but frequently is multi-directional and results in permeation of vibration throughout a system or structure. Therefore, linear shock absorbers and other systems that are adept at reducing vibration in a linear direction are inadequate for multi-directional applications. Therefore, it would be an additional benefit to provide a system capable of vibration dampening in a multi-directional application.

SUMMARY OF THE INVENTION

The present invention addresses this long-felt need and issue by providing a vibration dampener and/or dampening system that reduces vibration significantly while not impacting the use of the system being utilized.

The present invention addresses this long-felt need and unresolved issues by providing a vibration dampener and dampening system that reduces vibration significantly while not impacting the use of the device including tool, equipment or machinery being utilized. It is therefore one object of the invention to attenuate and control vibrations thus reducing damage or injury. It is the further object of the invention to provide an economical solution to control of vibration. Another object of the invention is to provide a system that is robust enough to work in a variety of different applications, but further is scalable to be used in large equipment or machinery such as motor systems including applications such as aircraft or motor vehicles, but may also be used in smaller applications such as hand held tools or equipment or even instrument panels, including control systems in aircraft or motor vehicles.

The present invention provides a vibration control system utilizing at least three connectors between two members defining parallel planes having a central axis perpendicular to the parallel planes with the three connectors being substantially equally spaced circumferentially around the central axis and having a dampening element disposed in the connectors. In an embodiment the connectors are in a direction facing the central axis. In an embodiment, a third member substantially parallel to the first two is connected through three additional substantially equally spaced connectors that may also be directed towards the central axis. In an embodiment the three connectors have disposed within themselves a dampening material that includes at least a material of a first durometer that is adequate for reducing a vibration and may be connected to the material of a second durometer. In cooperation, the first and second material reduce and attenuate a wide range of vibrational oscillations. In an embodiment, the vibration dampening system comprises three interconnected vibration dampening layers with the first layer interconnected with a second layer, and a second layer interconnected with a third layer. As stated, the layers or members have at least three vibration dampening connectors that are each substantially equally spaced and aligned toward a central axis running through each of the three layers. Alternatively, the connectors may be include a mix of some connectors directed towards the central axis and others may be parallel to the central axis or perpendicular to the central axis. Each connector has disposed within it vibration dampening element. The vibration dampening elements may be materials of the same or varying durometers at each point of connection and further may have a combination of materials with different durometers within a single connection point. The vibration dampening element may alternatively be a magneto-rheological damper, a viscous fluid damper or an inertial damper including an electronically controlled inertial damper. Each vibration dampening system having two or three layers with vibration dampening element interdisposed in the connections are referred to as "pods." Vibration dampening may be accomplished with having a single pod connected at a vibration connection point between a vibrating element and an associated connection such as an engine mount or may be disposed at any location along the system pathway between the vibrating element and associated components such as housing units, control systems, transportation components such as wheels, and various other locations, where vibration is apparent. In an embodiment where the vibration control system is used to reduce vibration in the machinery used for floor cleaning or polishing applications, the vibration dampener pod can be disposed between the machinery performing the polishing or cleaning application and separately in a handle or control arm connected indirectly through the pod to the vibrating system. Further, the handle or control arm can have separate wheels or casters, allowing for moving the floor polishing/cleaning system freely in multiple directions via the caster connections through the control arm. A similar embodiment is adaptable to a compacting machine such as a soil compactor.

In embodiments, a pod or pods may be interdisposed at single or multiple locations in applications having a structural element, a vibrating element, a handle attachment, and a handle grip. In an additional applications, a pod or pods are positioned at the base of a seating system such as an aircraft seat to reduce vibration to the seat occupant. Additionally, pods may be disposed in various locations throughout an aircraft to reduce vibration in critical vibration areas such as engine mount areas or in the instance of military aircraft, locations including gun connections. Further application includes connections around control panels to reduce vibration to sensitive systems. Additional applications include connections at points where systems include a vibrating element such as home appliances including washers and dryers connect to the vibrating element or to the floor. For hand tools including any tool that has a vibrating element there is an application for having a pod or pods disposed between the vibrating element and any handle or handles on the tool. In addition, pods may be disposed in a single weapon, such as a machine gun, to reduce vibration to its operator. The pods may be used in virtually any application involving tools, equipment or machinery that create vibrations.

In an additional embodiment, the invention provides for having an opening along the central axis of the pod wherein the opening creates a pathway for a tube or shaft thus allowing for providing a dampening of a system having a tube or shaft that potentially rotates within the pod. This also includes an embodiment having a bushing or bearing for interacting with the tube or shaft passing through the pod. This embodiment has particular application for oil well drilling, including a pod having an ability to allow for passing of fluids through the system in an application where it is connected to an inner tube and contained within an outer tube.

Other objects and features of the present invention will become apparent when viewed in light of the detailed description of the preferred embodiments when taken in conjunction with the attached drawings and the appended claims.

BRIEF DESCRIPTION OF THE DRAWINGS

The present invention will become more fully understood from the detailed description and the accompanying drawings, wherein:

FIG. 18 is a top view of a fourth embodiment of the vibration dampener system of the invention;

FIG. 19 is a side view of the fourth embodiment of the vibration dampener system as seen in FIG. 18;

FIG. 20 is a cross-sectional view of FIG. 18;

FIG. 22 is a top view of a portion of the vibration dampener system as seen in FIG. 21;

FIG. 23 is a cross-sectional view of a portion of FIG. 22;

FIG. 24 is a top view of a portion of the vibration dampener system as seen in FIG. 22;

FIG. 25 is a cross-sectional view of the portion seen in FIG. 24;

FIG. 26 is a top view of another component of the vibration dampener system of FIG. 21;

FIG. 27 is a cross-sectional view of a portion of the vibration dampening system as seen in FIG. 26;

FIG. 28 is a portion of the vibration dampening system showing a vibration dampening element; and FIG. 29 is a cross-sectional view of a portion of the vibrational dampener system of FIG. 21 showing a vibration dampening element.

DETAILED DESCRIPTION OF THE INVENTION

Figure 1:
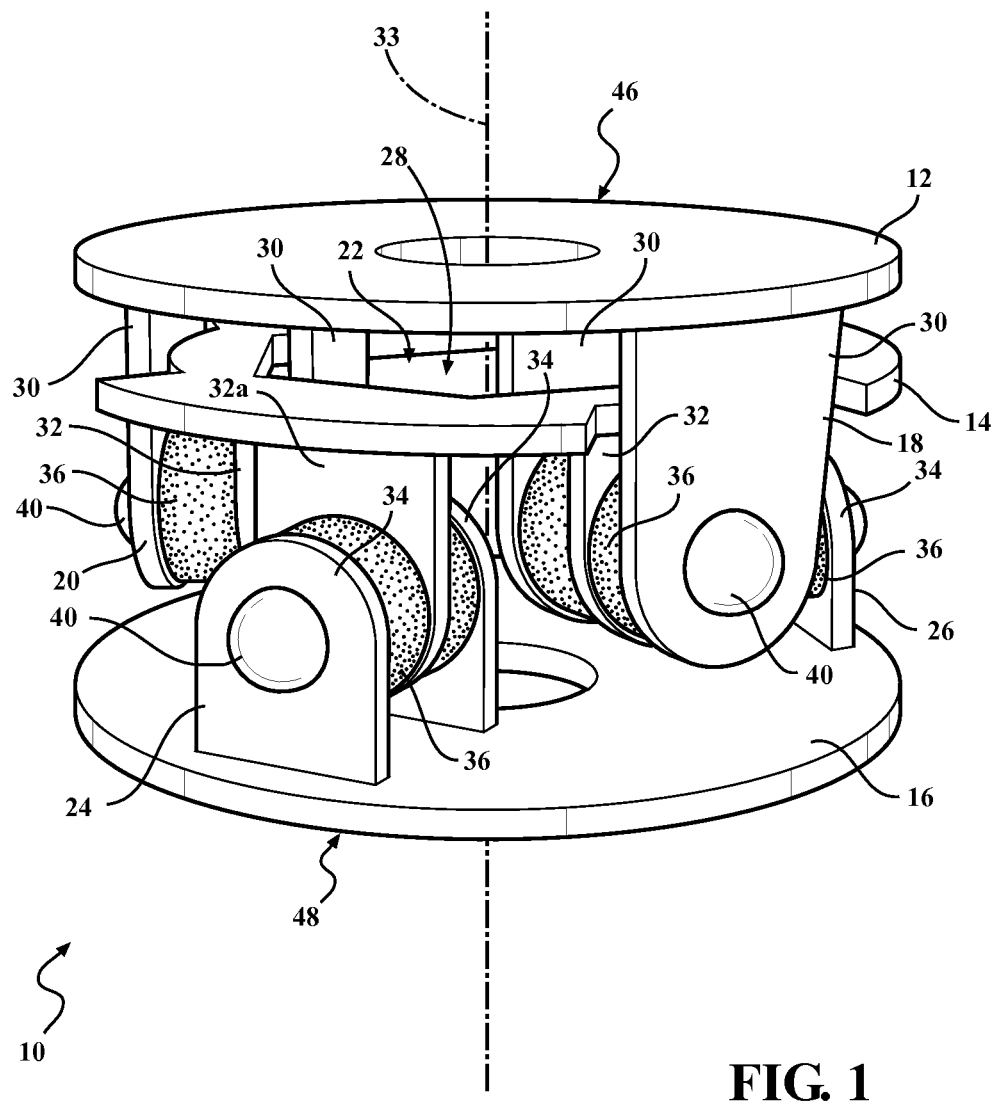
FIG. 1 is a perspective view of a first embodiment of a vibration dampener system of the invention.
Figure 2:
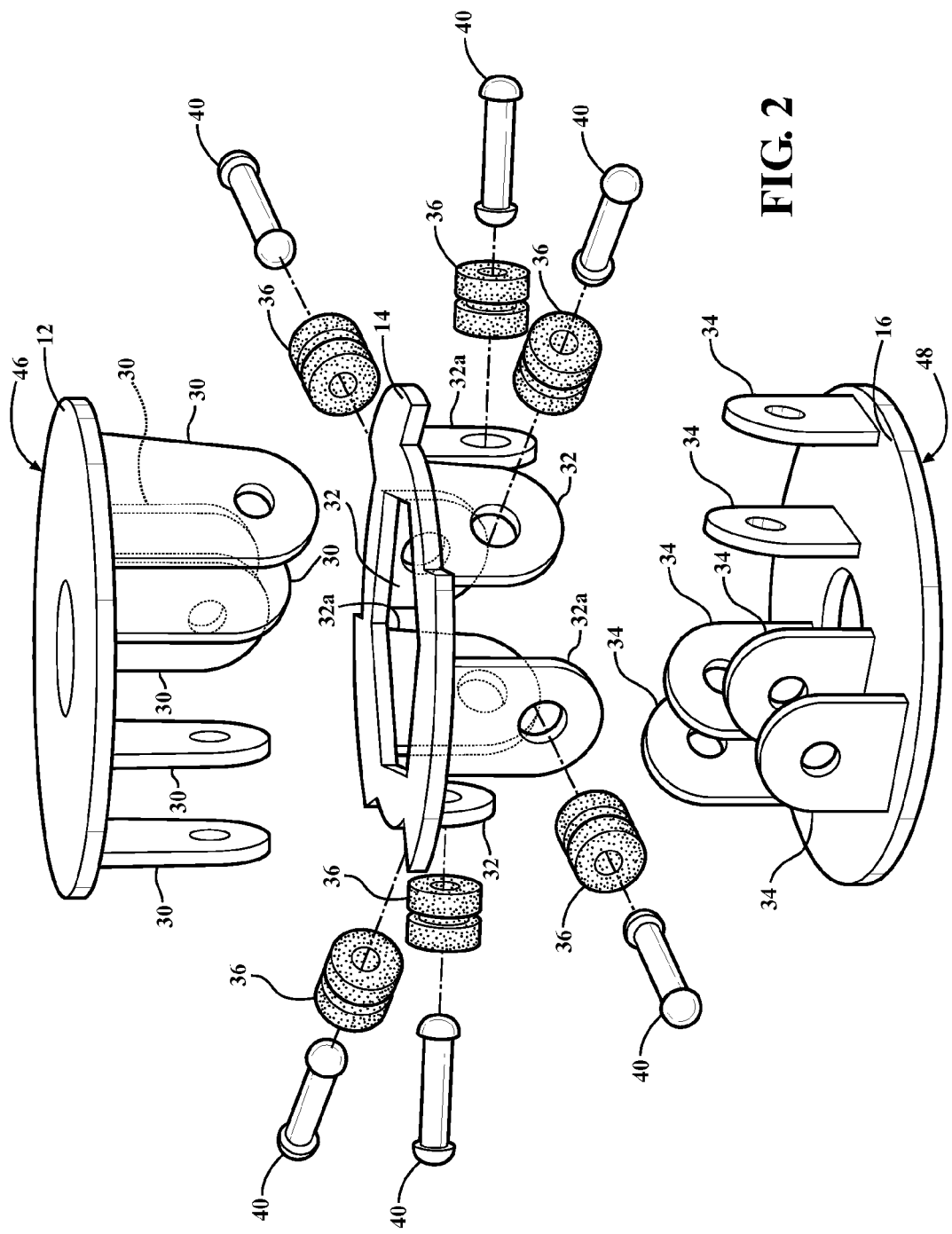
FIG. 2 is an exploded perspective view of the vibration dampener system of FIG. 1.
Figure 3:
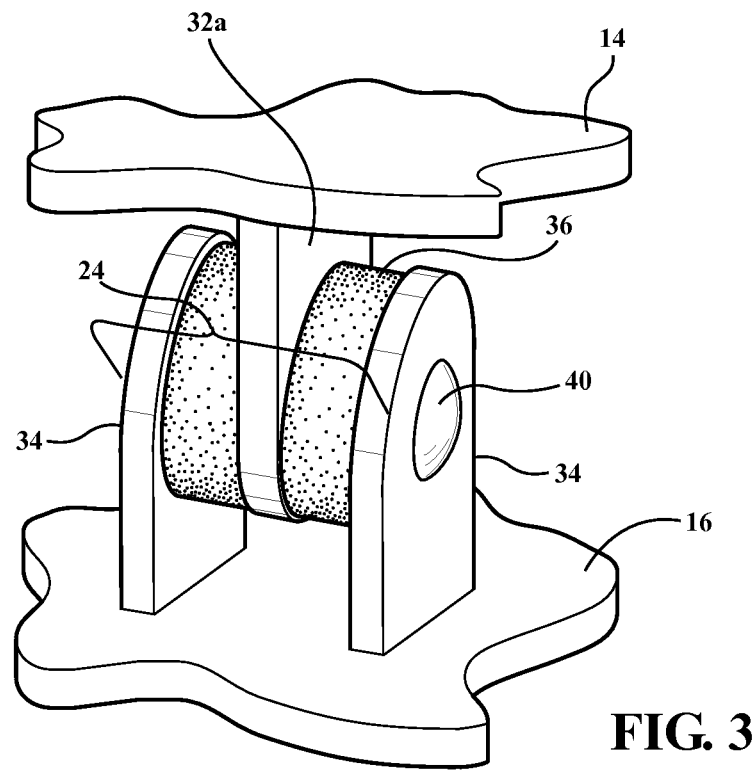
FIG. 3 is a perspective view of a cutout portion of the vibration dampener system of FIG. 1.
Figure 4:
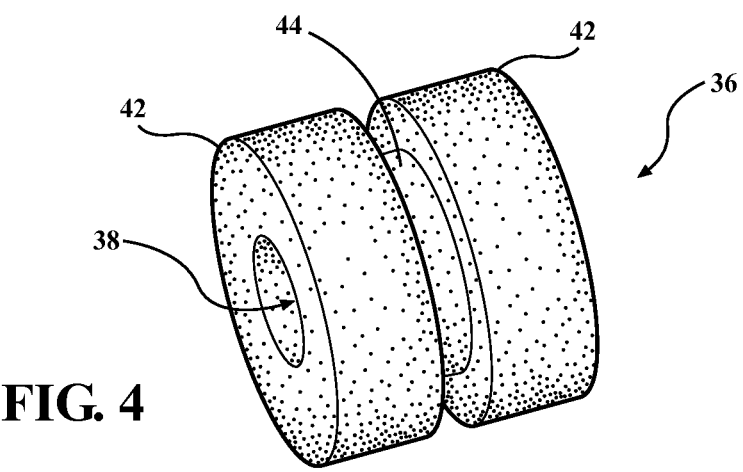
FIG. 4 is a perspective view of a dampening element of the vibration dampener system of FIG. 1.

In the following figures like reference numerals are used to identify identical components in the various views and embodiments. The following example is meant to be illustrative of preferred embodiments for the invention. However, those skilled in the art will recognize various additional alternative embodiments.

Referring to FIGS. 1-4, a vibration dampener system 10 of the invention has a first tier 12, a second tier 14 and a third tier 16. The first tier 12 is coupled to the second tier 14 at three locations, including a first connection 18, a second connection 20 and a third connection 22. The third tier 16 is coupled to the second tier 14 at three locations including a fourth connection 24, a fifth connection 26, and a sixth connection 28. The first tier 12 has three sets of flanges 30 interconnecting with a set of second tier flanges 32. Third tier 16 is interconnected with the second tier 14 through a second set of second tier flanges 32a interconnected with a set of third tier flanges 34. Each coupling between the first tier 12, second tier 14, and third tier 16 includes a dampening element 36 for isolating and dampening vibration within the vibration dampener system 10. The dampening elements 36 include an opening 38 for receiving a rod 40 passing through each of the flanges and the dampening element 36. The dampening element 36 includes end portions 42 and a middle indentation 44 for interconnecting with an opening in one of the flanges. The dampening element 36 is made from a material suitable for dampening vibrations, such as a rubber, plastic, polyurethane or other material known to those skilled in the art. Commercially available products include Tear-Resistant Light Duty Vibration-Damping Mounts by McMaster-Carr. But, other suitable dampeners are appropriate. This includes: a Lead Lag Damper manufactured by Lord Corporation; an inertial dampener; a Magneto Rheological dampener; a spring-based dampener; and combinations of any of the above-identified vibration dampening agents or modifications thereof known to those skilled in the art. This may also include systems know to those skilled in the art for adjusting the dampeners such as for adjusting the Magneto Rheological dampener or other active dampener type.

In addition, the dampening element 36 may be an amalgamation of materials having differing durometer ratings. Thus, the dampening elements are adaptable to reduce vibration of differing degrees. Vibration detection pickup elements known to those skilled in the art may be used that are attached about the connections and/or the individual dampening elements for the purpose of evaluating the vibration effectiveness of the system.

The first tier 12, second tier 14 and third tier 16 are made out of a rigid material such as metal, including steel, suitable for withstanding the forces existing in the environment, where the vibration dampener system 10 is being deployed. Other materials of adequately rigidity for transferring vibrations to the isolators are suitable. Advantageously, the thickness, size and dimensions of the tiers, flanges, rods, and dampening elements can all be scaled up or down in a manner suitable for a particular application where vibration dampening is desirable. Common to the various applications and dimensions of the vibration dampener system components is tiers interdisposed with dampening elements as illustrated having at least three elements per tier where each element is generally directed toward an axis 33 perpendicular to a plane common to each of the tiers. This arrangement creates a complex of phase shifting and redirection of vibration back onto the dampening elements in a continuous manner. The flanges can be welded on to the tiers or otherwise suitably connected. Alternatively, the flanges may be stamped out of the tier and bent into position for interconnection with another tier.

The vibration dampener system 10 is connected on a first side 46 to a vibration emitting source, or another component downstream from the vibration emitting source, and on a second side 48 to an area where vibration is not desirable, such as a control handle or other structure where it is desirable to reduce vibration. This includes but is not limited to tools, equipment or machinery such as: laundry equipment; air conditioners; pressure washers; landscaping equipment; hand tools; snow blowers; lawnmowers; HVAC equipment; part handling vibrators; construction equipment; weapon systems; cement mixers; kitchen appliances; oil well drillers; vehicles including aircraft, motor vehicles and boats; engine or motor mounts; and other devices. Further, the vibration dampener system 10 can be used individually in order to dampen vibrations or with additional tiers having a similar interconnection thus extending the vibration dampening effect through a wider area of interconnected tiers having multiple dampening elements. Each individual vibration dampener system is referred to herein as a "pod." One or more pods can be used to dampen vibration. For example, several pods can be used in proximity to enhance vibration dampening over a wider area or pods may be interconnected to extend vibration dampening. As an example, more than one vibration dampener system 10 such as illustrated in FIGS. 1 and 5 can be connected in series to increase vibration dampening.

Thus, the vibration dampener system 10 is suitable for a wide range of applications and uses. It could, for example, be miniaturized to less than two centimeters (or even smaller) and used to reduce vibration when implemented between an instrument panel and an interior structure of a vehicle such as an aircraft. Alternatively, the vibration dampener system 10 can be scaled to a meter or more in diameter and include ten or more dampening elements at each tier for reducing vibration in the use of heavy machinery.

Figure 5:
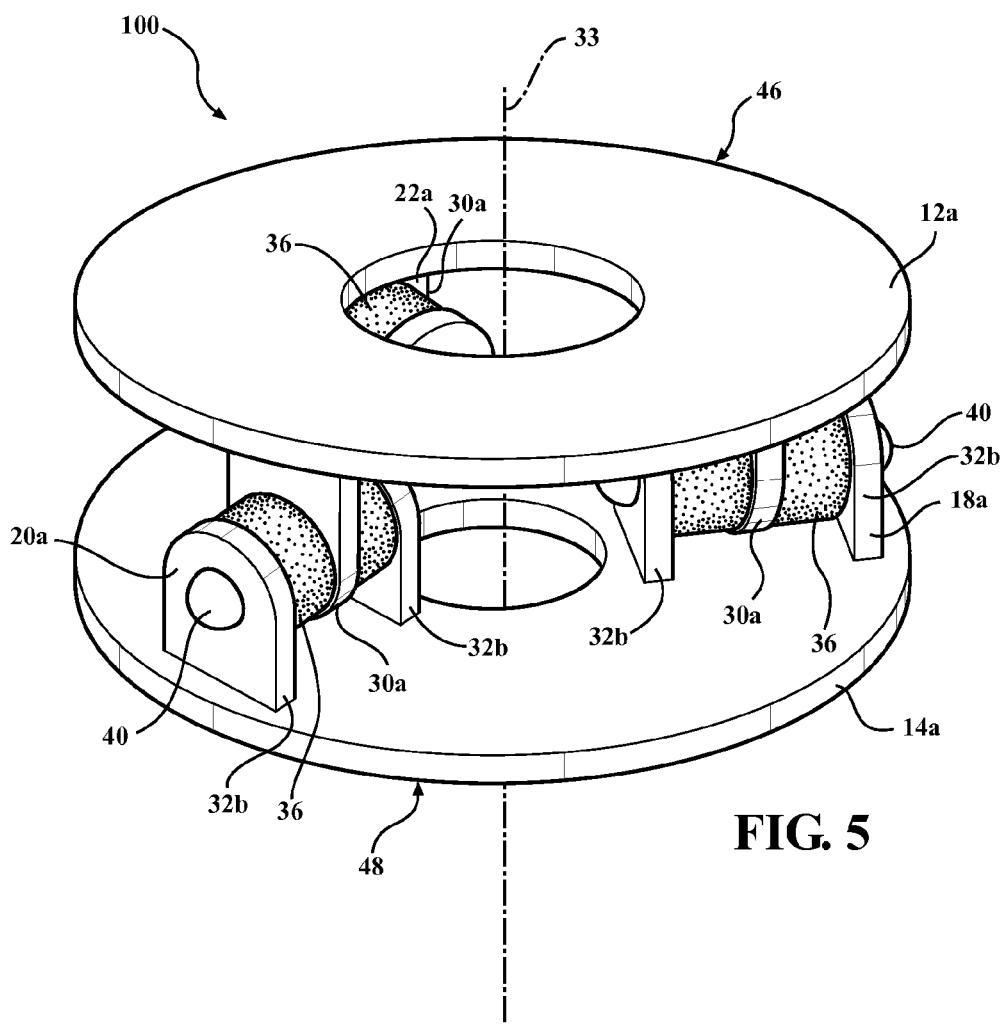
FIG. 5 is a perspective view of a second embodiment of the vibration dampener system of the invention.

Now referring to FIG. 5 is a second embodiment of a vibration dampener system 100. In the second embodiment, the vibration dampener system 100 has a first tier 12a and a second tier 14a that are interconnected by a first connection 18a, a second connection 20a, and a third connection 22a. Flanges 30a are disposed circumferentially about the axis 33 central to the tiers. Second tier flanges 32b are disposed around the second tier 14a in connection.

Second tier flanges 32b are disposed around the second tier 14a in connection with the first tier 12a flanges 30a. Each connection between the first tier 12a and second tier 14a includes a dampening element 36 for dampening vibration within the vibration dampener system 100. This embodiment of a vibration dampener system may also be scaled to a size appropriate for its vibration dampening application. It may also be integrated with the vibration dampener system disclosed in relation to FIG. 1. Common to the various applications and dimensions of the vibration dampener system components is tiers interdisposed with dampening elements as illustrated having at least three elements per tier where each element is generally directed toward an axis 33 perpendicular to a plane common to each of the tiers.

Figure 6:
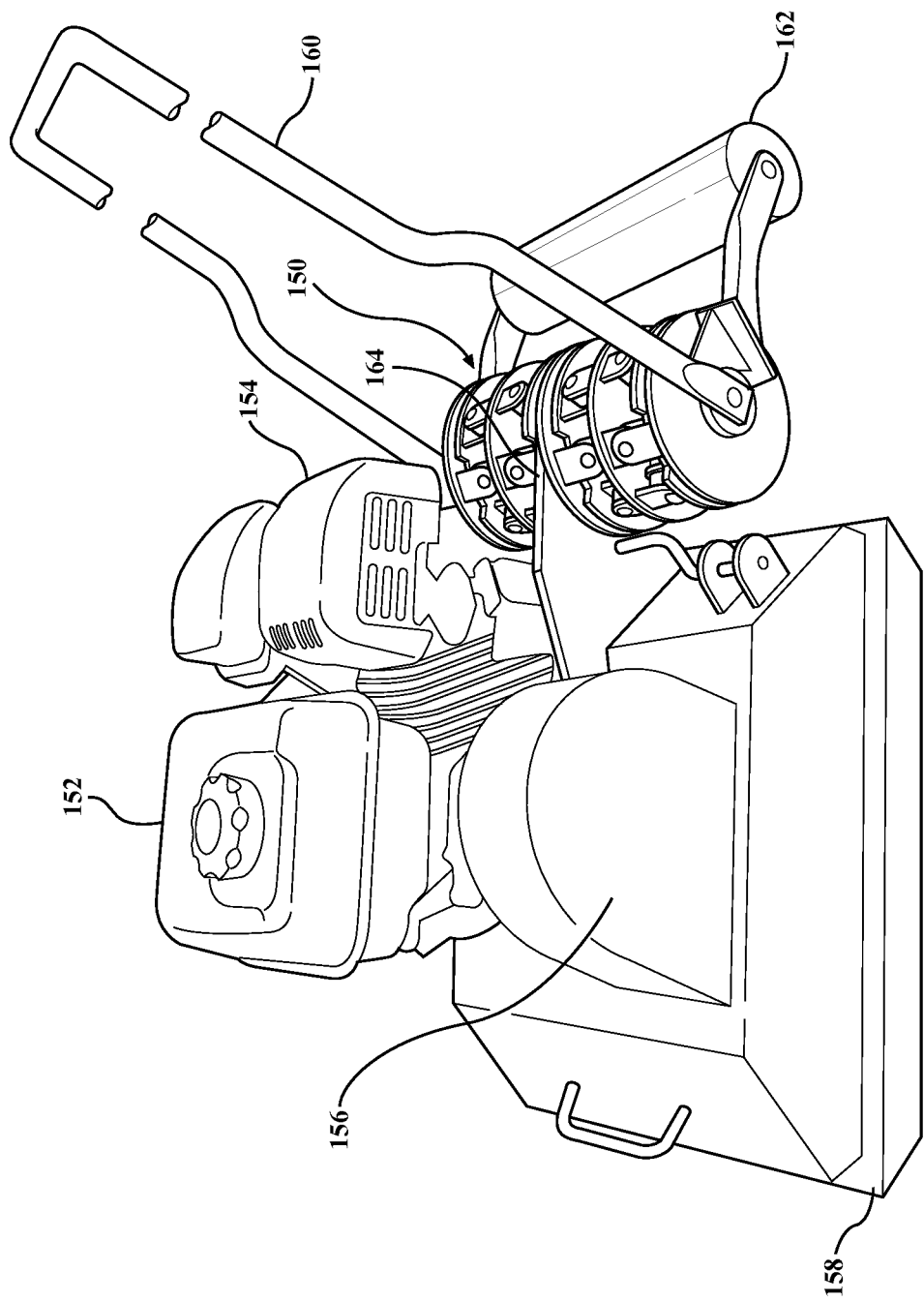
FIG. 6 is an embodiment of the vibration dampener system of the invention as embodied in a soil compactor machine.

Referring to FIG. 6 is an embodiment of the vibration dampener system 150 incorporated into equipment 152. The equipment 152, in this instance, a soil compactor, includes an engine 154 for oscillating a vibrator 156 (hidden) that is connected to a vibrating element 158, in this instance a soil compactor plate. A handle 160 is separated from the vibrating equipment 152 through the vibration dampener system 150. The handle 160 is also connected to a roller 162 for contacting with the ground. The vibration dampener system 150 includes two pods of the first embodiment of the vibration dampener system 10 on each side of a central connection 164. In operation, the engine 154 on the equipment 152 is started, causing the vibrator 156 to oscillate the vibrating element 158. Advantageously, the vibration dampening system 150 dramatically reduces the amount of vibration to an operator holding the handle 160. As a further advantage and benefit of the vibration dampener system is an increased ability to move the equipment 152 while in operation. Not only does the user of the equipment have a reduced risk of injury, the equipment is better controlled during its operation. Similarly, the vibration dampening system of the invention can be used in a wide range of applications including manual operation of equipment having a vibrating source.

Although the equipment 152 is shown with an engine 154, it could be adapted to use an electric powered motor as known to those skilled in the art including the use of power storage units such as batteries to power the motor. Advantageously, the vibration dampening system can be used between the batteries and the vibrating portion of the equipment 152 thus reducing wear on the batteries and promoting better longevity of the batteries. Further, the equipment 152 could include a power driving system known to those skilled in the art. The power driving system could also advantageously be coupled to the vibrating portion of the equipment 152 with the vibration dampening system. Further, the equipment 152 could include a control system known to those skilled in the art for allowing for remote operation of the equipment 152. The control system could also be separated from the vibrating portion of the equipment 152 with use of the vibration dampening system.

Figure 7:
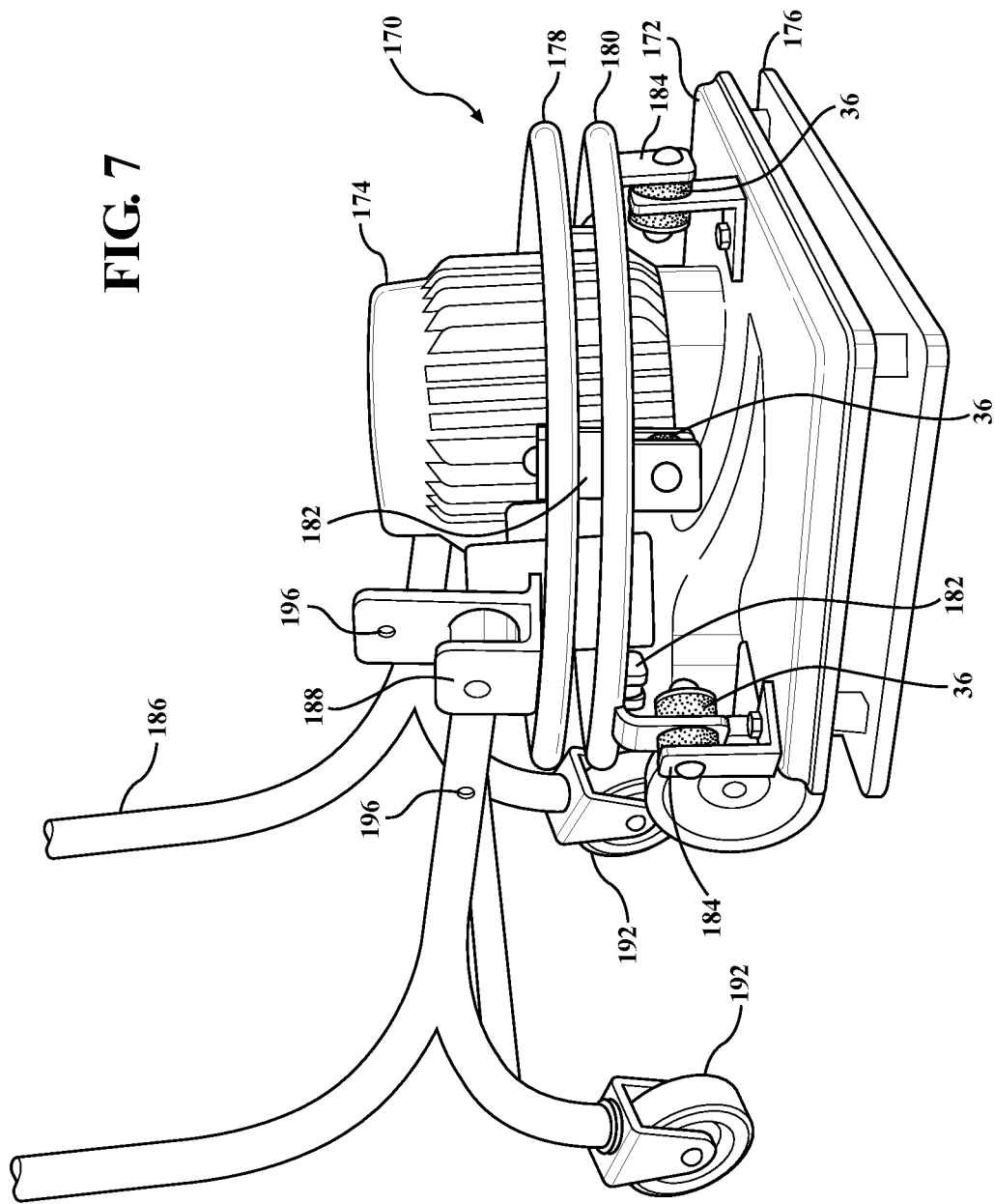
FIG. 7 is a perspective view of the vibration dampener system of the invention as embodied in a floor cleaning machine.
Figure 8:
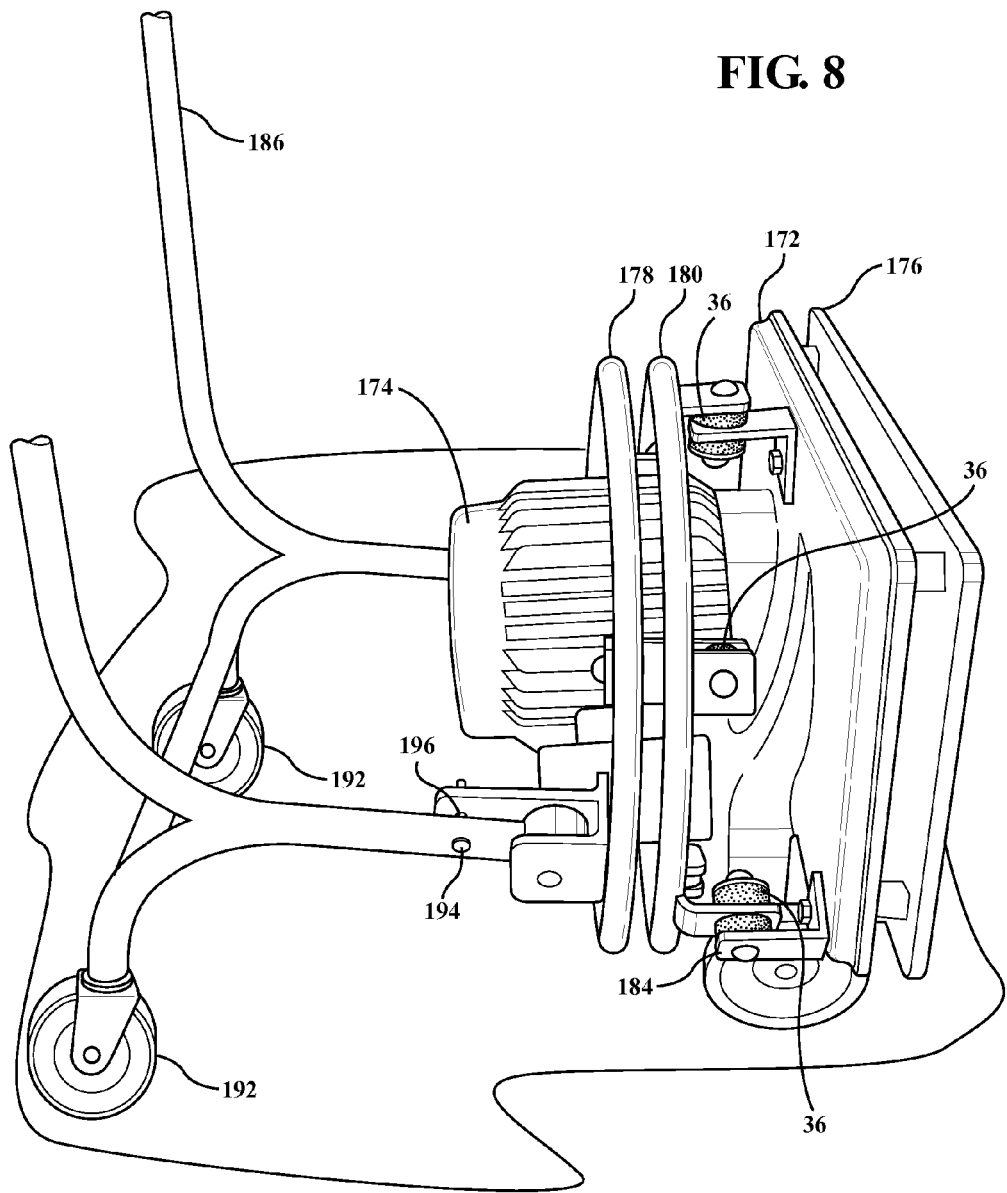
FIG. 8 is a perspective view of the floor cleaning machine of FIG. 7 in an alternative orientation.

Referring now to FIG. 7 is another embodiment of the vibration dampener system 170 in connection with the use of floor cleaning equipment 172. The floor cleaning equipment 172 includes a motor 174 connected to an oscillator (hidden) which is connected to an oscillating plate 176 used for cleaning a floor surface. The vibration dampener system 170 includes a first ring 178 connected to a second ring 180 with dampening elements 36 disposed therebetween as discussed in relation to the second embodiment of the vibration dampener system 100. In this embodiment, the vibration dampener system 170 includes three connection points 182 (not all three are visible) for connecting the vibration dampener 170 to the floor cleaning equipment 172. This includes additional dampening elements 184 for reducing vibration at the point of connection between the vibration dampener system 170 and the floor cleaning equipment 172. The floor cleaning equipment handle 186 is connected at a first point 188 and second point (not visible) of the floor cleaning equipment 172 and is thus isolated from the vibrating portion of the equipment. The floor polishing equipment handle 186 is also connected to wheels 192, in this case, casters. Thus, in operation, the operator of the floor cleaning equipment 172 experiences dramatically reduced vibration to his hands and arms. Further, the operator of this equipment has significant improved control over its movement when in operation, including movement in a lateral direction. Referring briefly to FIG. 8, the floor cleaning equipment 172 is shown with the handle 186 rotated to a locked position with pin 194 through openings 196. Thus, the floor cleaning equipment 172 is advantageously placed into a position allowing for easy transportation when not in use. This embodiment demonstrates another variation on attaching a vibration dampening system of the invention to equipment in a manner that will significantly reduce vibration and allow for better operation of the equipment. The same type of embodiment may be widely used in various forms and on many types of equipment to advantageously allow for better vibration reduction and control of the equipment.

Figure 9:
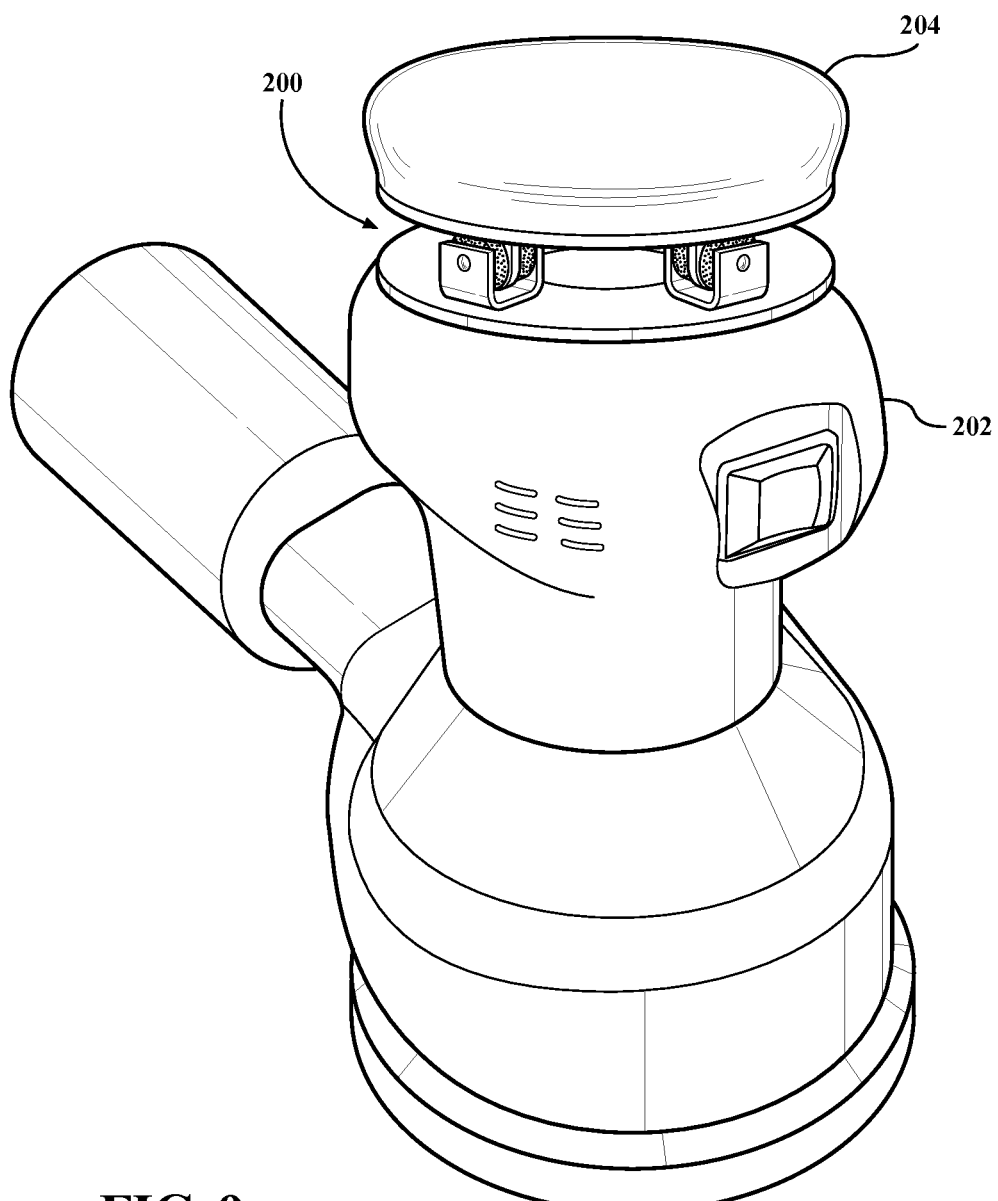
FIG. 9 is a perspective view of the vibration dampening system of the invention embodied in a hand sander.

Now referring to FIG. 9, an embodiment of the vibration dampening system 200 is seen in use on a hand held tool 202, in this case, a palm sander. This embodiment of the vibration dampening system is of the type disclosed in relation to FIG. 5. The vibration dampener system 200 in this embodiment is between a handle portion 204 and the hand held tool 202, itself. In this embodiment, the user is isolated from vibration emitting from the hand held tool. As an alternative, incorporation of the vibration dampening system into a hand held tool or other application, more than one pod can be disposed between a handle and the tool itself.

Figure 10:
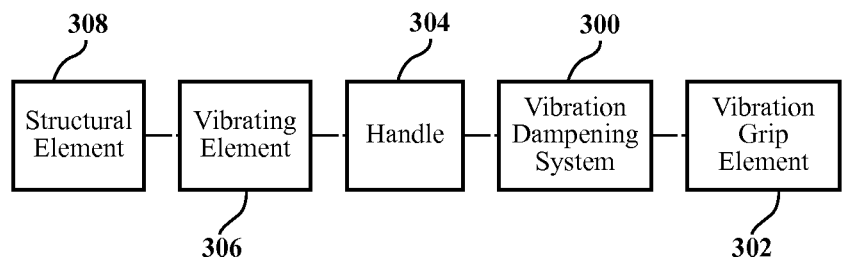
FIG. 10 is a block diagram of an arrangement for inclusion of the vibration dampener dampening system of the invention in a tool, equipment or machinery.

Referring now to FIG. 10, the vibration dampening system of the invention 300, including its various embodiments already disclosed, is illustrated in relation to other components of machinery or equipment as previously identified, thus showing alternative arrangements for inclusion of the vibration dampening system 300. In FIG. 10, the vibration dampening system is between a handle grip element 302 and a handle 304 which is connected to a vibrating element 306 which in turn is connected to a structural element 308.

Figure 11:
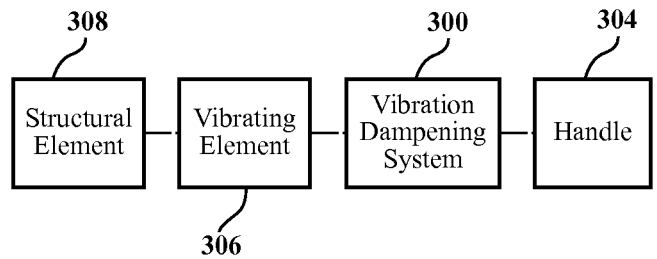
FIG. 11 is a block diagram of a second alternative inclusion of the vibration dampener system in a tool, equipment or machinery.

Now referring to FIG. 11, the vibration dampening system 300 is between the handle 304 and the vibrating element 306 with the vibrating element 306 connected to the structural element 308.

Figure 12:
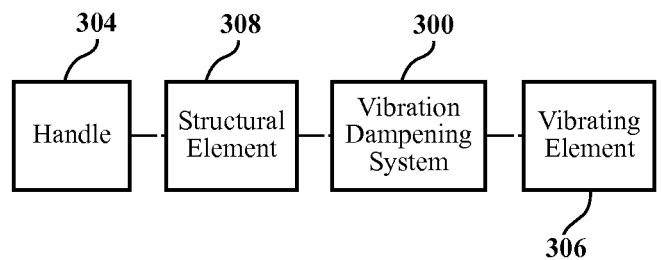
FIG. 12 is a block diagram of a third inclusion of the vibration dampener system.

Referring to FIG. 12, the vibration dampening system 300 is between the vibrating element 306 and the structural element 308 which in turn is connected to a handle 304.

Figure 13:
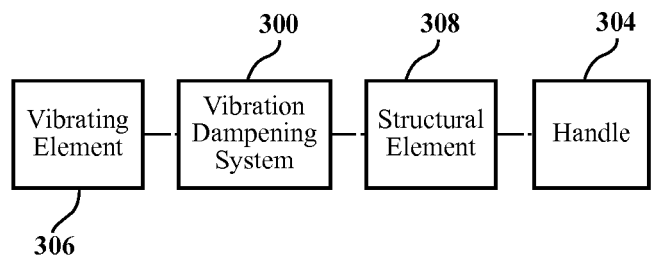
FIG. 13 is a block diagram of a fourth inclusion of the vibration dampener system.

Referring to FIG. 13, the vibration dampening system 300 is between the vibrating element 306 and the structural element 308, which in turn is connected to a handle 304.

Figure 14:
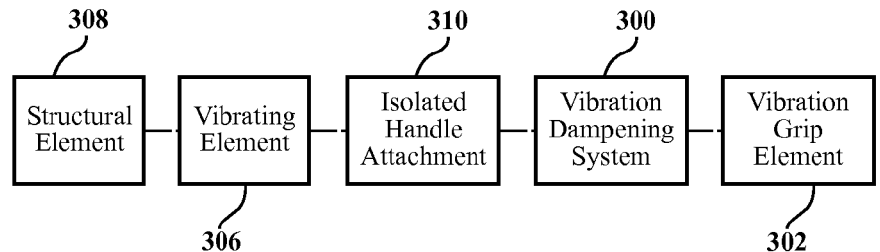
FIG. 14 is a block diagram of a fifth inclusion of the vibration dampener system.

Referring to FIG. 14, the vibration dampening system 300 is between a handle grip element 302 and an isolated handle attachment 310 which is connected to a vibrating element 306 which in turn is connected to the structural element 308.

Figure 15:
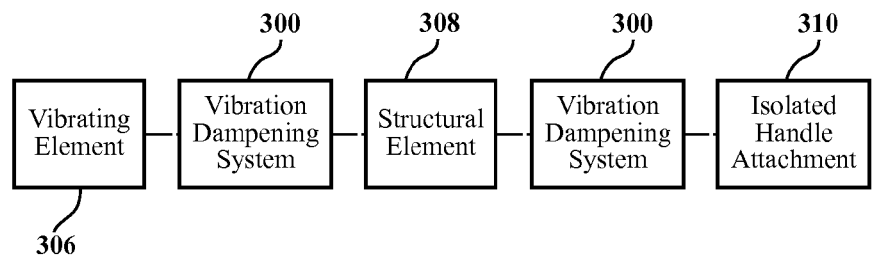
FIG. 15 is a block diagram of a sixth inclusion of the vibration dampener system.

Referring to FIG. 15, the vibration dampening system 300 is positioned on two sides of the structural element 308, including between the structural element 308 and an isolated handle 310 on one side, and between the structural element 308 and the vibrating element 306 on the other side.

Figure 16:
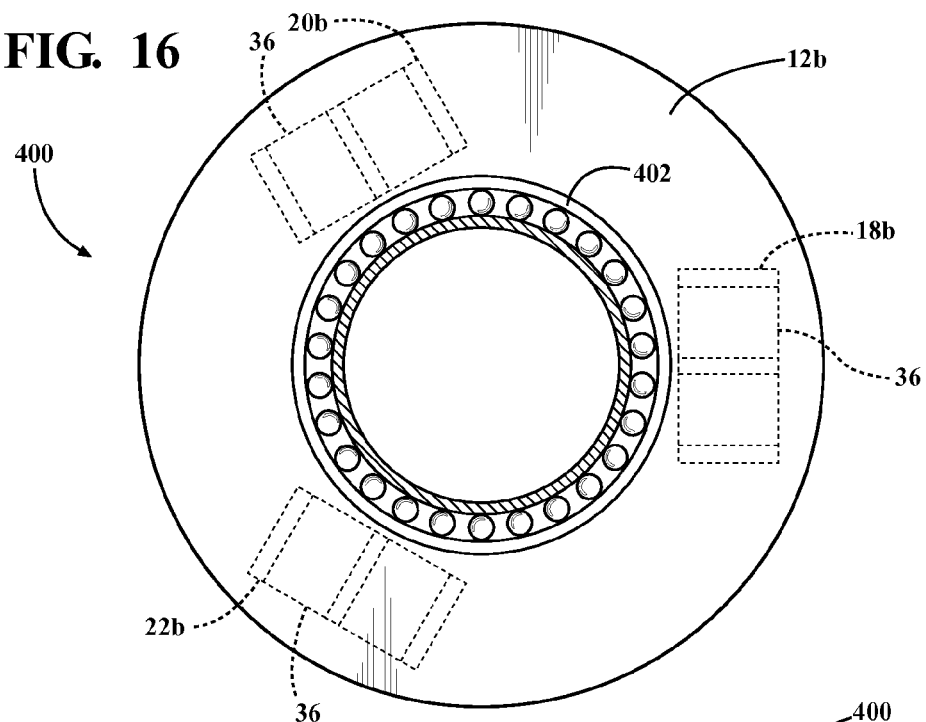
FIG. 16 is a top view of a third embodiment of the vibration dampener system of the invention.
Figure 17:
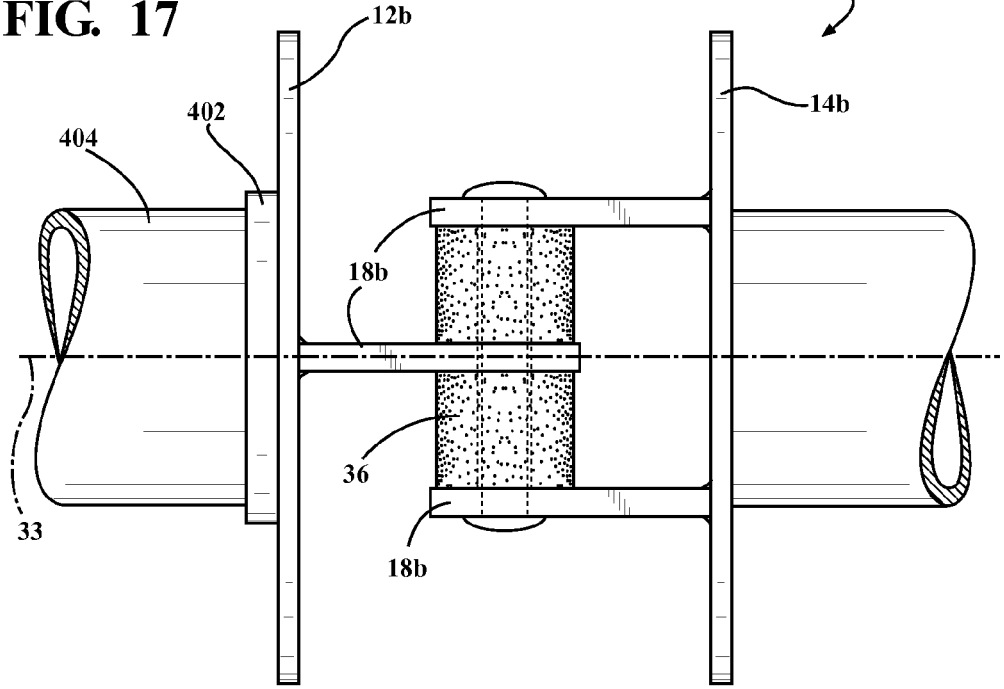
FIG. 17 is a partial side view of the third embodiment of a vibration dampener system of FIG. 16.
Figure 21:
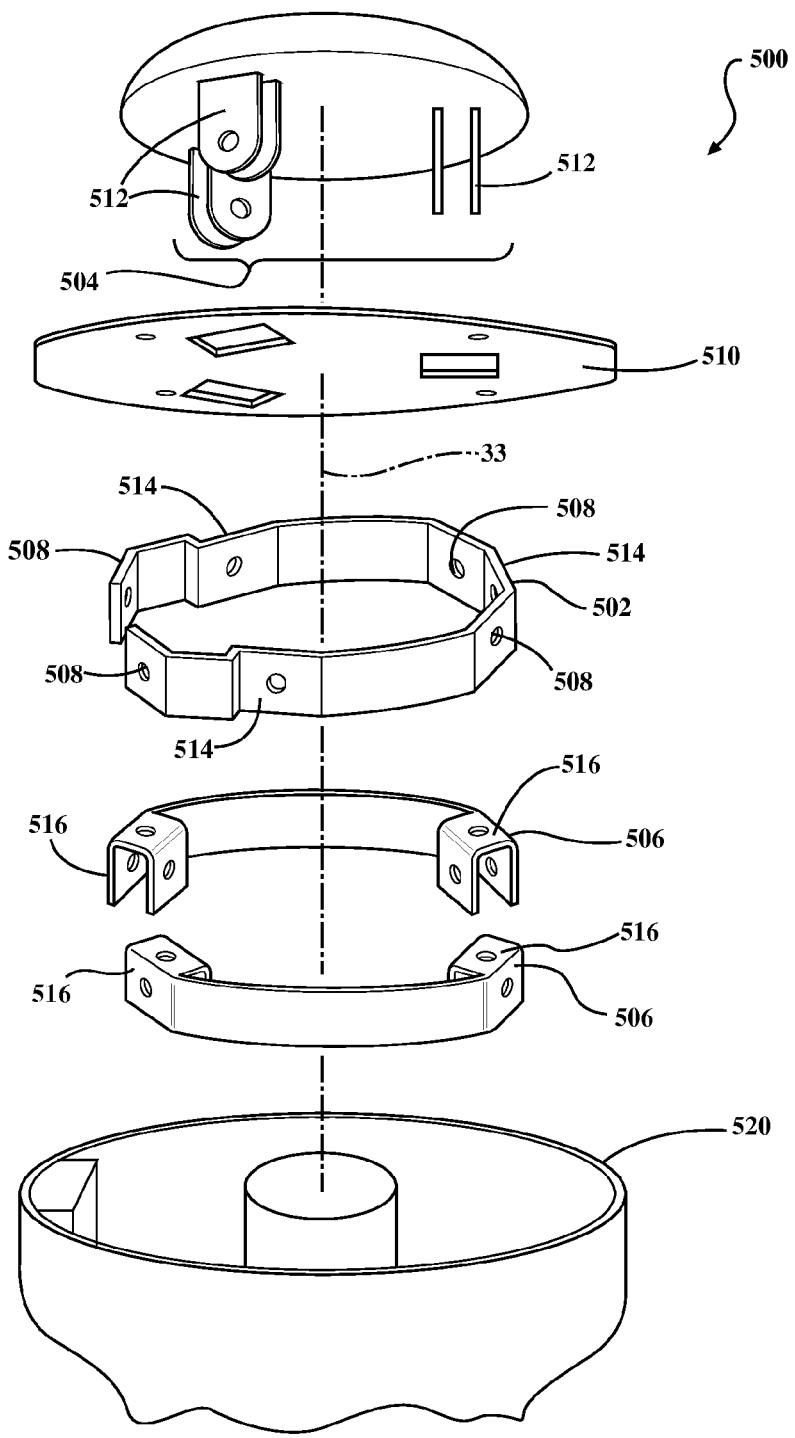
FIG. 21 is a sixth alternative embodiment of the vibration dampener system of the invention embodied in a palm sander.

Referring to FIGS. 16 and 17, another embodiment of the vibration dampener system has a first tier 12b and a second tier 14b that are interconnected by a first connection 18b, a second connection 20b, and a third connection 22b. Centered between the first connection 18b, second connection 20b, and third connection 22b is a bearing assembly 402 coupled to an open tube 404. The bearing assembly 402 is of the type generally known to those skilled in the art including, but not limited to, a plain bearing, sleeve bearing, rifle bearing, and flexible bearing. This coupling to both the tier and the open tube 404 provides for vibration control of a rotating tube or alternatively, a rotating shaft. For example, this has application in oil drilling. In this embodiment, the connections and related dampening elements are circumferentially disposed around the central axis 33 such that lines perpendicular to the axis of each rod 40 are directed generally towards the central axis 33. This orientation is adapted particularly for reducing rotational vibration such as may occur in the instance of a tube such as an oil well drilling tube is rotating inside a well being drilled, but may also be used for other applications.

Now referring to FIGS. 18-20, another embodiment of the vibration dampener system 450 includes a first tier 12c and second tier 14c interconnected by a first connection 18c, a second connection 20c, and a third connection 22c. In this embodiment, lines passing through each of the connectors are parallel to the central axis 33 and equally spaced circumferentially around the central axis.

It should be appreciated that the differing orientations of the connectors and related dampening elements may be combined on one or more tiers to account for supporting a load in addition to dampening vibrations. In each embodiment, at least three connections and related dampening elements have a relation to the central axis that provides for capturing and refocusing vibrations in a manner that provides for high efficiency in dampening the vibrations.

Now referring to FIGS. 21-29 is another alternative embodiment of a vibration dampener system 500, embodied in a palm sander. In this embodiment, a first tier 502 is interconnected with a second tier 504 and also interconnected with a two-piece third tier 506. The third tier 506 includes fasteners 516 to an outer housing 510. The second tier connectors 512 are interconnected with first tier connectors 514. First tier connectors 508 are also interconnected with third tier connectors 516 which are all disposed in a lower housing 520. The various connectors are inter-disposed with dampening elements 522 for dampening vibrations. In this embodiment, it is demonstrated that the tiers while directing the connectors towards the central axis 33 can include tiers of different shapes and including a tier having more than one supporting member. As illustrated, this embodiment is suitable for use with a hand tool such as a palm sander, but is also adaptable to other uses as explained herein.

The above disclosures may also include a monitoring system for a series of vibration structures isolated from one to the next. Vibration measuring sensor elements can be attached throughout the isolators and structures. The sensors are either wired or wirelessly attached to a display element. The display element may have as an element the ability to alert the operator of system failure.

Thus, the vibration dampening system of the invention, including its various embodiments, provides a strong, stable, cost effective and scalable means of addressing the negative consequences of vibration.

While particular embodiments of the invention have been shown and described, numerous variations and alternative embodiments will occur to those skilled in the art. Accordingly, it is intended that the invention be limited only in terms of the appended claims.

What is claimed is:

1. A vibration dampener for dampening vibration of a mechanical apparatus having an interior portion, comprising:
   first, second and third structural elements each element having a substantially flat portion to define parallel planes wherein the first structural element is connected to an element manually engageable with a user and includes at least three first tier connectors interconnecting with the second structural element connected to a vibrating element, wherein the third structural element includes at least three third tier connectors interconnecting with the second structural element wherein the connectors are interdisposed with a vibration dampening element and wherein the connectors each have an axis parallel to the planes and are substantially equally spaced around each of the structural elements, wherein the axes on any one tier intersect one another within the interior portion of the mechanical apparatus.

2. The vibration dampener for dampening vibration of a mechanical apparatus of claim 1 wherein each connector comprises a cylindrical member for interconnecting the second structural element to the first and third structural element to the second structural element.

3. The vibration dampener for dampening vibration of a mechanical apparatus of claim 2 wherein the cylindrical member passes through an opening in the connectors and retains the vibration dampening element within the connectors.

4. The vibration dampener for dampening vibration of a mechanical apparatus of claim 3 wherein at least some of the openings in the connectors are larger than the cylindrical member wherein a portion of the vibration dampening element is between the cylindrical member and the inside of the opening.

5. The vibration dampener for dampening vibration of a mechanical apparatus of claim 1 wherein the connectors are concentrically displaced around the respective axis perpendicular to the respective related planes.

6. The vibration dampener for dampening vibration of a mechanical apparatus of claim 1 wherein the vibration dampening element comprises a rubber material.

7. The vibration dampener for dampening vibration of a mechanical apparatus of claim 1 wherein the vibration dampening element comprises at least two materials having different durometer ratings.

8. The vibration dampener for dampening vibration of a mechanical apparatus of claim 1 wherein the vibration dampening element comprises a combination of vibration dampening element types.

9. The vibration dampener for dampening vibration of a mechanical apparatus of claim 8 wherein the vibration dampening element types include at least one of a rubber material, a magneto-rheological damper, a viscous liquid, an inertial damper, an electronically controlled inertial damper, and a biasing member.

10. The vibration dampener for dampening vibration of a mechanical apparatus of claim 1 wherein the vibration dampening element comprises at least one of a rubber material, a magneto-rheological damper, a viscous liquid, an inertial damper, an electronically controlled inertial damper, and a biasing member.

11. The vibration dampener for dampening vibration of a mechanical apparatus of claim 1 wherein at least one of the first, second, and third structural elements further comprises a opening around the axis perpendicular to the planes corresponding to the respective element.

12. The vibration dampener for dampening vibration of a mechanical apparatus of claim 1 wherein the at least three first tier connectors and the at least three third tier connectors are substantially in a common plane.

13. The vibration dampener for dampening vibration of a mechanical apparatus of claim 1 wherein the at least three first tier connectors and the at least three third tier connectors are in different planes parallel to common planes.

14. The vibration dampener for dampening vibration of a mechanical apparatus of claim 1 further comprising at least one additional structural element defined by additional parallel common planes wherein each additional structural element has at least three additional connectors.

15. The vibration dampener for dampening vibration of a mechanical apparatus of claim 1 wherein the mechanical apparatus is a hand tool and the vibration dampener is disposed between a vibrating element in the hand tool and a handle of the hand tool.

16. The vibration dampener for dampening vibration of a mechanical apparatus of claim 1 wherein the mechanical apparatus is a floor cleaning or polishing machine and the vibration dampener is disposed between a vibrating element in the floor cleaning or polishing machine and a handle of the floor cleaning or polishing machine.

17. The vibration dampener for dampening vibration of a mechanical apparatus of claim 1 wherein the mechanical apparatus is a floor cleaning or polishing machine and the vibration dampener is disposed between a vibrating element in the floor cleaning or polishing machine and a handle of the floor cleaning or polishing machine.

18. A vibration dampener for dampening vibration of a hand tool, comprising:

a first tier and a second tier wherein the first and second tiers are defined by parallel planes, and a third tier defined by a plane parallel to the planes of the first and second tiers, each plane having a central axis perpendicular to the plane, wherein the first tier includes at least three first tier connectors interconnecting with at least three second tier connectors via the third tier, wherein the connectors are interdisposed with a vibration dampening element and wherein the connectors have an axis parallel to the parallel planes and substantially concentrically spaced around the central axis perpendicular to the parallel planes, wherein the vibration dampener is disposed between a vibrating element in the hand tool and a handle of the hand tool.

19. A vibration dampener for dampening vibration of a mechanical apparatus having a handle, comprising:

a first tier and a second tier wherein the first and second tiers are defined by parallel planes, and a third tier defined by a plane parallel to the planes of the first and second tiers, each plane having a central axis perpendicular to the plane, wherein the first tier includes at least three first tier connectors interconnecting with at least three second tier connectors via the third tier, wherein the connectors are interdisposed with a vibration dampening element and wherein the connectors have an axis parallel to the parallel planes and substantially concentrically spaced around the central axis perpendicular to the parallel planes, wherein the vibration dampener is disposed in a handle of the mechanical apparatus.

20. A vibration dampener for dampening vibration of a mechanical apparatus, comprising:

a first tier and a second tier wherein the first and second tiers are defined by parallel planes, and a third tier defined by a plane parallel to the planes of the first and second tiers, each plane having a central axis perpendicular to the plane, wherein the first tier includes at least three first tier connectors interconnecting with at least three second tier connectors via the third tier, wherein the connectors are interdisposed with a vibration dampening element and wherein the connectors have an axis parallel to the parallel planes and substantially concentrically spaced around the central axis perpendicular to the parallel planes, wherein the vibration dampener is disposed between a handle of the mechanical apparatus and an isolated handle attachment wherein the handle attachment is connected to a vibrating element of the mechanical apparatus and the vibrating element is attached to a structural element of the mechanical apparatus.

* * * * *